(12) United States Patent
Teggatz et al.

(10) Patent No.: US 9,793,814 B2
(45) Date of Patent: Oct. 17, 2017

(54) LOW POWER CONVERTER

(71) Applicant: TRIUNE SYSTEMS, LLC, Plano, TX (US)

(72) Inventors: Ross E. Teggatz, Plano, TX (US); Brett Smith, Plano, TX (US); Amer Atrash, Plano, TX (US); Wayne Chen, Plano, TX (US)

(73) Assignee: TRIUNE SYSTEMS, LLC, Plano, TX (US)

( * ) Notice: Subject to any disclaimer, the term of this patent is extended or adjusted under 35 U.S.C. 154(b) by 0 days.

(21) Appl. No.: 14/970,396

(22) Filed: Dec. 15, 2015

(65) Prior Publication Data

US 2016/0105115 A1    Apr. 14, 2016

Related U.S. Application Data

(60) Continuation of application No. 14/230,645, filed on Mar. 31, 2014, now Pat. No. 9,214,867, which is a division of application No. 12/954,635, filed on Nov. 25, 2010, now Pat. No. 8,687,385.

(60) Provisional application No. 61/264,644, filed on Nov. 25, 2009.

(51) Int. Cl.
*H02M 3/335*  (2006.01)
*H02M 1/00*  (2006.01)

(52) U.S. Cl.
CPC ................. *H02M 3/33507* (2013.01); *H02M 2001/0032* (2013.01); *Y02B 70/16* (2013.01)

(58) Field of Classification Search
CPC .. H02M 3/335; H02M 3/33507; H02M 7/155; H02M 7/1557; H02M 2001/0032
See application file for complete search history.

(56) References Cited

U.S. PATENT DOCUMENTS

| | | | |
|---|---|---|---|
| 5,818,707 A | 10/1998 | Seong et al. | |
| 6,295,217 B1 | 9/2001 | Yang et al. | |
| 6,462,437 B1* | 10/2002 | Marmaropoulos | ..... H02J 9/005 307/125 |
| 6,914,394 B2 | 7/2005 | Weirich | |
| 7,489,532 B2 | 2/2009 | Shih | |
| 7,535,734 B2 | 5/2009 | Li et al. | |
| 8,035,998 B2* | 10/2011 | Kada | ................. H02M 3/33507 323/222 |
| 2004/0032752 A1* | 2/2004 | Kim | ................. H02M 3/33507 363/21.12 |
| 2011/0305051 A1 | 12/2011 | Yang et al. | |
| 2014/0126249 A1* | 5/2014 | Polivka | ................. G01R 19/10 363/21.17 |

* cited by examiner

*Primary Examiner* — Matthew Nguyen
(74) *Attorney, Agent, or Firm* — Jackson Walker LLP; Christopher J. Rourk; Thomas B. Hayes

(57) ABSTRACT

An AC to DC converter system is disclosed in which a conversion circuit for converting an AC input signal to a DC output signal is operably coupled with an enabling circuit designed for sensing and output parameter indicative of the presence or absence of a load at the DC output. The system is designed so that the conversion circuit operates in an inactive standby state when there is no load, and in an active state for supplying DC power when a load is present. The enabling circuit is configured to operate using low power.

19 Claims, 5 Drawing Sheets

LOW POWER CONVERTER

RELATED APPLICATIONS

The present application is a continuation of U.S. patent application Ser. No. 14/230,645, filed Mar. 31, 2014, now U.S. Pat. No. 9,214,867, which is a divisional of U.S. patent application Ser. No. 12/954,635, filed Nov. 25, 2010, now U.S. Pat. No. 8,687,385 which claims priority to U.S. Provisional Patent Application Ser. No. 61/264,644, filed on Nov. 25, 2009, each of which are hereby incorporated by reference for all purposes as if set forth herein in their entirety.

TECHNICAL FIELD

The invention relates to the more efficient utilization of energy resources and energy conservation. More particularly, the invention relates to electronic systems for conversion of an alternating current (AC) to a direct current (DC), and to the use of low power converters to power DC devices and/or charge DC energy storage apparatus.

BACKGROUND OF THE INVENTION

It is known to design power supply, converter, and charger systems to receive an AC power source as input power, and to convert the AC power to DC power for the output. A disadvantage of many such systems is that they remain active, and consume power, even when there is no load on the output. Such systems, configured for using an AC power source for powering electronic apparatus and/or for charging DC energy storage apparatus, such as batteries, are common. Frequently, such AC/DC adapters and chargers are left plugged in to an AC source even when no DC power is required. In other words, they continue to convert their AC input into DC for output, thereby consuming power, even when no output is needed. The AC/DC converter topologies commonly used in the arts tend to share this same basic characteristic due to their physical and electrical structure. This inherently leads to decreased efficiency and possibly a reduction in system longevity.

Due to these and other problems and potential problems with the current state of the art, improved methods, apparatus, and AC/DC conversion and charger systems would be useful and advantageous additions to the art.

SUMMARY OF THE INVENTION

In carrying out the principles of the present invention, in accordance with preferred embodiments, the invention provides advances in the arts with novel methods and apparatus directed to providing AC/DC converters, adapters, and charging systems with capabilities for detecting load conditions and halting the AC to DC conversion when the load does not require it. In preferred embodiments, the system enters into an extremely low power standby mode until output power is needed at the load, and/or until a standby mode power supply residing with the converter is replenished for another low power standby operation cycle.

According to one aspect of the invention, in an example of a preferred embodiment, an AC/DC converter system is configured for receiving an AC power input signal and converting the input signal to a DC output signal. An enabling circuit is provided for sensing an output parameter and for switching the conversion circuit between an active state and an inactive state in response to the sensed output parameter.

According to another aspect of the invention, in an exemplary preferred embodiment, the system described immediately above also includes a power storage device in the enabling circuit for supplying power thereto.

According to still another aspect of the invention, preferred embodiments of the system of the invention include systems wherein the DC output is operably coupled with portable electronic apparatus.

According to yet another aspect of the invention, a preferred embodiment of an AC to DC converter system has an input for receiving an AC input and a conversion circuit for converting the AC input signal to a DC output signal. An enabling circuit is adapted to switch the conversion circuit between an active state and an inactive state in response to a load switch.

According to another aspect of the invention, in an example of a preferred embodiment, an AC to DC converter system has an AC power input, a conversion circuit for converting the AC signal to a DC output signal. An enabling circuit configured to switch the conversion circuit between an active state and an inactive state in response to a sensed parameter or a load switch, is capacitively coupled for receiving power from the AC input.

The invention has advantages including but not limited to one or more of the following; providing efficient AC to DC power conversion at a range of operating levels and/or providing an extremely low power standby mode adaptable to real time load conditions. These and other advantageous features and benefits of the present invention can be understood by one of ordinary skill in the arts upon careful consideration of the detailed description of representative embodiments of the invention in connection with the accompanying drawings.

BRIEF DESCRIPTION OF THE DRAWINGS

The present invention will be more clearly understood from consideration of the following detailed description and drawings in which.

References in the detailed description correspond to like references in the various drawings unless otherwise noted. Descriptive and directional terms used in the written description such as right, left, back, top, bottom, upper, side, et cetera, refer to the drawings themselves as laid out on the paper and not to physical limitations of the invention unless specifically noted. The drawings are not to scale, and some features of embodiments shown and discussed are simplified or amplified for illustrating principles and features, as well as anticipated and unanticipated advantages of the invention.

DESCRIPTION OF PREFERRED EMBODIMENTS

While the making and using of various exemplary embodiments of the invention are discussed herein, it should be appreciated that the present invention provides inventive concepts which can be embodied in a wide variety of specific contexts. It should be understood that the invention may be practiced with various alternative components without altering the principles of the invention. For purposes of clarity, detailed descriptions of functions, components, and systems familiar to those skilled in the applicable arts are not included. In general, the invention provides power supply, conversion, and charger control capabilities useful in a variety of applications and systems.

Figure 1:
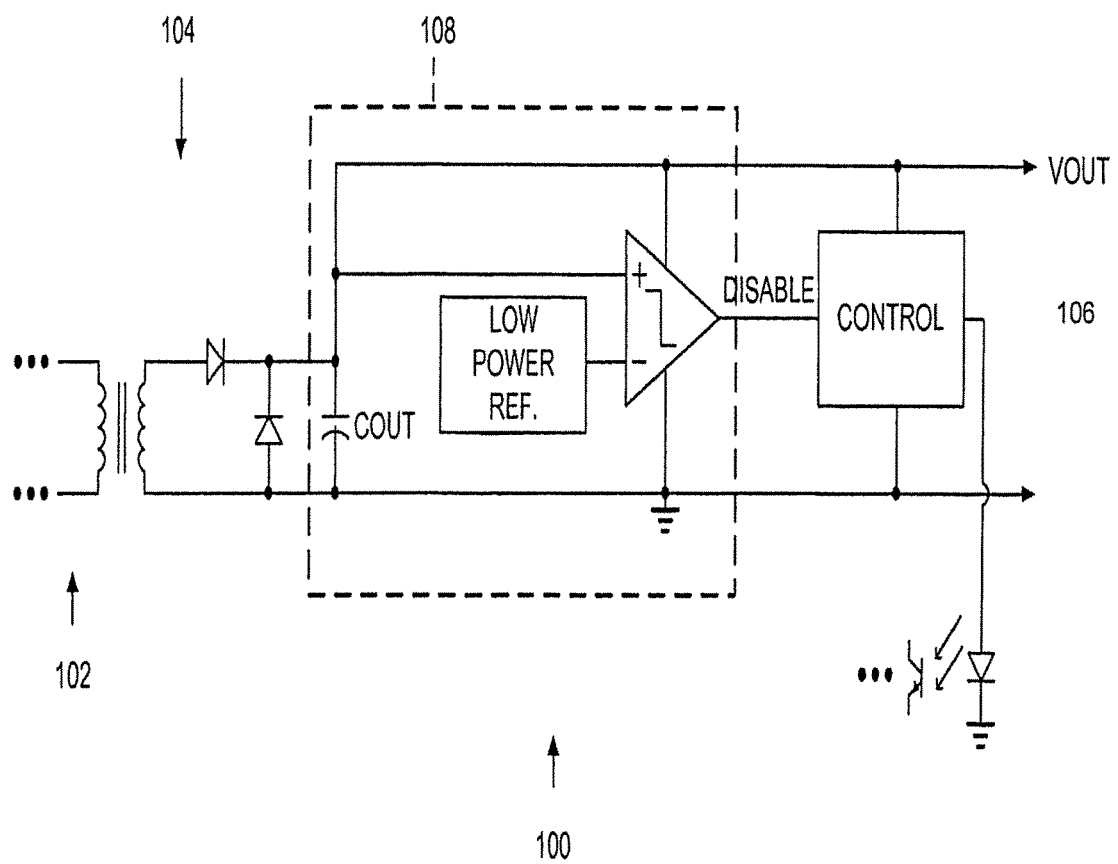
FIG. 1 is a simplified schematic drawing of an example of a preferred embodiment of a circuit for sensing real time power requirements for use in AC/DC power conversion systems according to the invention.

In general, the invention provides circuits and systems by which AC to DC adapters and/or chargers may be enabled during periods when a DC load is detected, and by which they may be placed in a low power standby state during periods when it is detected that AC/DC conversion is not required. The low power circuits and systems in presently preferred embodiments also include capabilities for ensuring that the system has access to sufficient power to operate in standby mode for significant periods of time, preferably including the capability for replenishing energy stored for use in standby mode. Referring primarily to FIG. 1, an AC to DC converter circuit 100 has an input 102 configured for receiving an AC power input signal and a power conversion circuit 104, typically including transformers and rectifiers as known in the art, for converting the AC input signal to a DC output signal appropriate for delivery to a DC load at an output node 106. The DC load(s) connected to the output 106 may constitute one or more DC-operated circuits and/or battery and/or other DC power storage devices or arrays of such devices. Deployed between the power conversion circuit 104 and the output 106, an enabling circuit 108 is configured to sense one or more output parameter associated with the output 106, and is further configured for switching the power conversion circuit 104 between an active state and an inactive standby state in response to the sensed output parameter. In this example of a preferred embodiment, the enabling circuit 108 includes a low power, preferably on the order of nano-amps (nA), comparator 110 for sensing the DC output voltage ($V_{OUT}$) at the output node 106. Those skilled in the arts will appreciate that the enabling circuit 108 comparator 110, or other component, may alternatively be configured to sense other output parameters such as, for example, current, power, impedance, capacitance, magnetic field(s), or to receive an external signal such as a wireless transmission or timing signal. An alternative implementation, for example, may include a comparator configured for monitoring output current instead of output voltage. If sufficient output voltage is available and the output current is below a certain predetermined threshold, then the power conversion circuit 104 is not needed for supplying output current, and is placed in its standby state. When the output voltage drops below a certain predetermined threshold, or when the output current exceeds a certain threshold, the conversion circuitry 104 is again operated in the active state to supply the output current. It is believed that for many applications, monitoring output current without monitoring the output voltage will be sufficient for control of the system 100.

The enabling circuit 108 is preferably operated using power from an energy storage device provided for that purpose, such as a battery or capacitor, e.g., $C_{OUT}$ in FIG. 1. During operation of the power conversion circuit 104 in its active mode, the comparator 110 may be operated using output from the conversion circuitry 104, and/or from the dedicated storage device, e.g., capacitor $C_{OUT}$. Preferably, when a load is detected at the DC output 106 by the enabling circuit 108, the power conversion circuit 104 is activated for converting an AC signal received at the input 102 into a DC signal at the output terminal 106 connected to the detected load (not shown), Preferably, the comparator 110 is configured to detect, based on one or more selected parameter(s) reaching selected threshold(s), whether operation of the power conversion circuitry 104 in either an active state or inactive standby state is required. Preferably, when no load is detected at the DC output 106, the power conversion circuit 104 is placed in an inactive standby state. While the power conversion circuit 104 is in the standby state, the comparator 110 is powered by power stored in the enabling circuit 108, in this example a charge stored on the capacitor $C_{OUT}$. Since the comparator 110 is preferably configured to operate with extremely low quiescent current, a relatively small sized capacitor $C_{OUT}$ provides significant operating time. When the voltage on the capacitor $C_{OUT}$ drops below a predetermined threshold level, the power conversion circuitry 104 is activated. During the operation of the power conversion circuit 104 in this active state, the charge on the capacitor $C_{OUT}$ is replenished. When the sensed output parameter, in this example voltage ($V_{OUT}$), reaches a predetermined threshold the power conversion circuitry 104 turns off, entering the inactive state, and only the low-power comparator 110 remains on, minimizing the system 100 power consumption.

Figure 2:
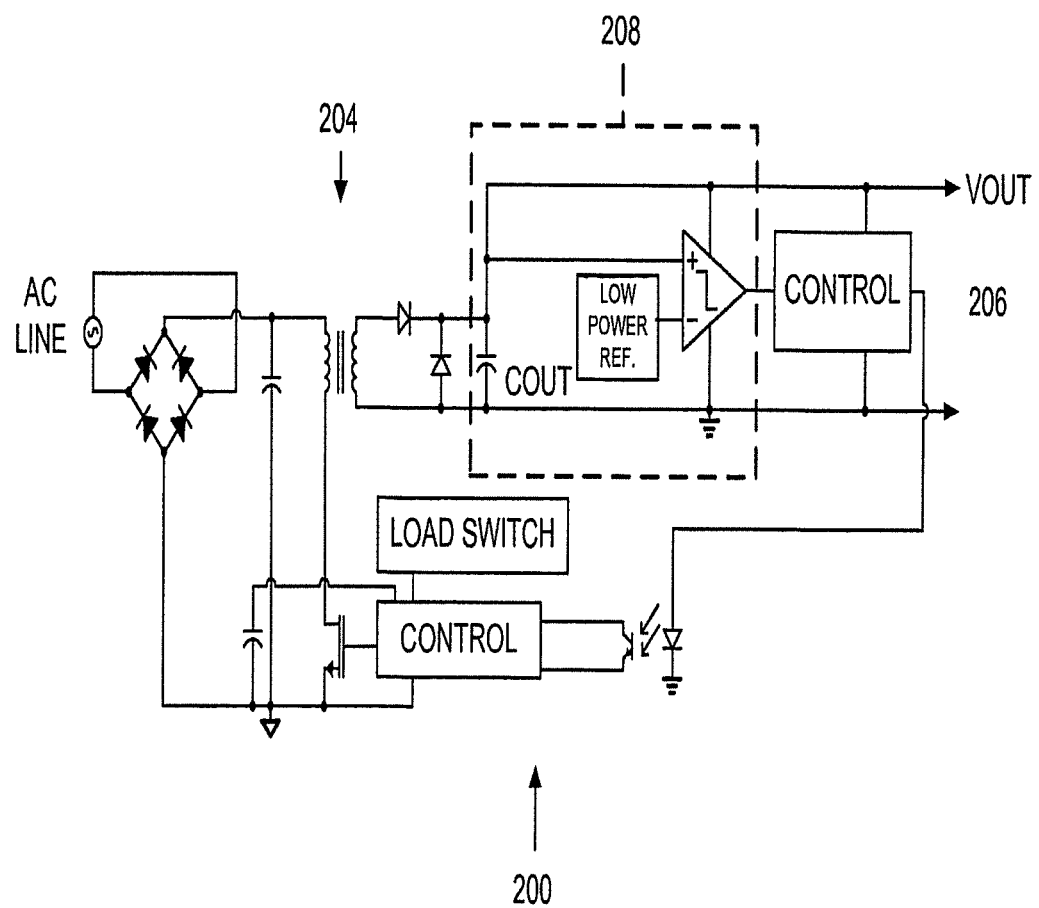
FIG. 2 is a simplified schematic drawing showing an example of another preferred embodiment of low power converter circuitry according to the principles of the invention.

In an alternative embodiment of the invention, an example of which is illustrated in FIG. 2, the parameter monitored for making the determination of when to switch the conversion circuitry 204 to or from the active or standby mode may be a signal communicated by a load connected to the output 206. The system 200, as illustrated in FIG. 2, may be configured such that a load connected at the output 206 communicates to the AC/DC converter 204 using a periodic, watchdog type protocol, wireless signal, or other serial/parallel communication. Using this configuration, the enabling circuit 208 receives a signal from the load communicating that power is required to be supplied at the output 206. Accordingly, the enabling circuit 208 causes the conversion circuit 204 to operate in the active mode. When a signal is received indicating that power is not required at the output 206, the enabling circuit 208 causes the conversion circuit 204 to enter the standby mode and stop consuming and supplying power. The enabling circuit 108 then continues to monitor the output 206 for a signal which would again cause it to place the converter circuit 204 in the active state.

Figure 3:
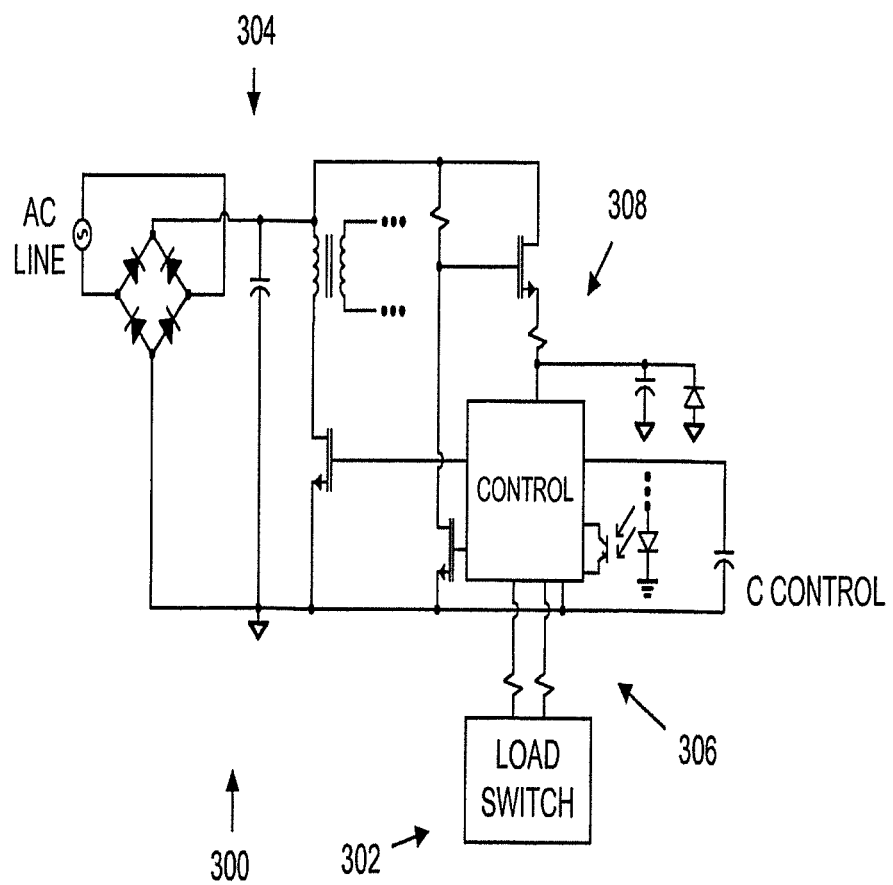
FIG. 3 is a simplified schematic drawing illustrating another example of an alternative preferred embodiment of low power converter circuitry according to the invention.

Now referring primarily to FIG. 3, an alternative implementation of the invention is shown. In this circuit 300, the presence of a load at the output 306 is detected by the operation of a switch 302, preferably located in the adapter plug in typical power converter applications. When a load is present at the output 306, the converter circuit 304 is enabled by operation of the enabling circuit 308. When no load is detected at the output 306 by operation of the switch 302, the power conversion circuitry 304 is placed in its inactive standby state and the enabling circuit 308 is placed in low power mode, drawing its power from an associated power storage device, in this example capacitor $C_{CONTROL}$. The load switch 302 can be implemented in a variety of ways as long as communication with the enabling circuit is provided. In a preferred embodiment, a mechanical switch is used. The switch is activated by the completion and/or removal of a physical connection to the output node 306, e.g., by insertion or removal of a suitable output jack 306 into compatible apparatus. In alternative implementations, a proximity switch, such as a capacitive, inductive, optical, magnetic, resistive, or infrared sensor activated switch may be used without departure from the invention.

Figure 4:
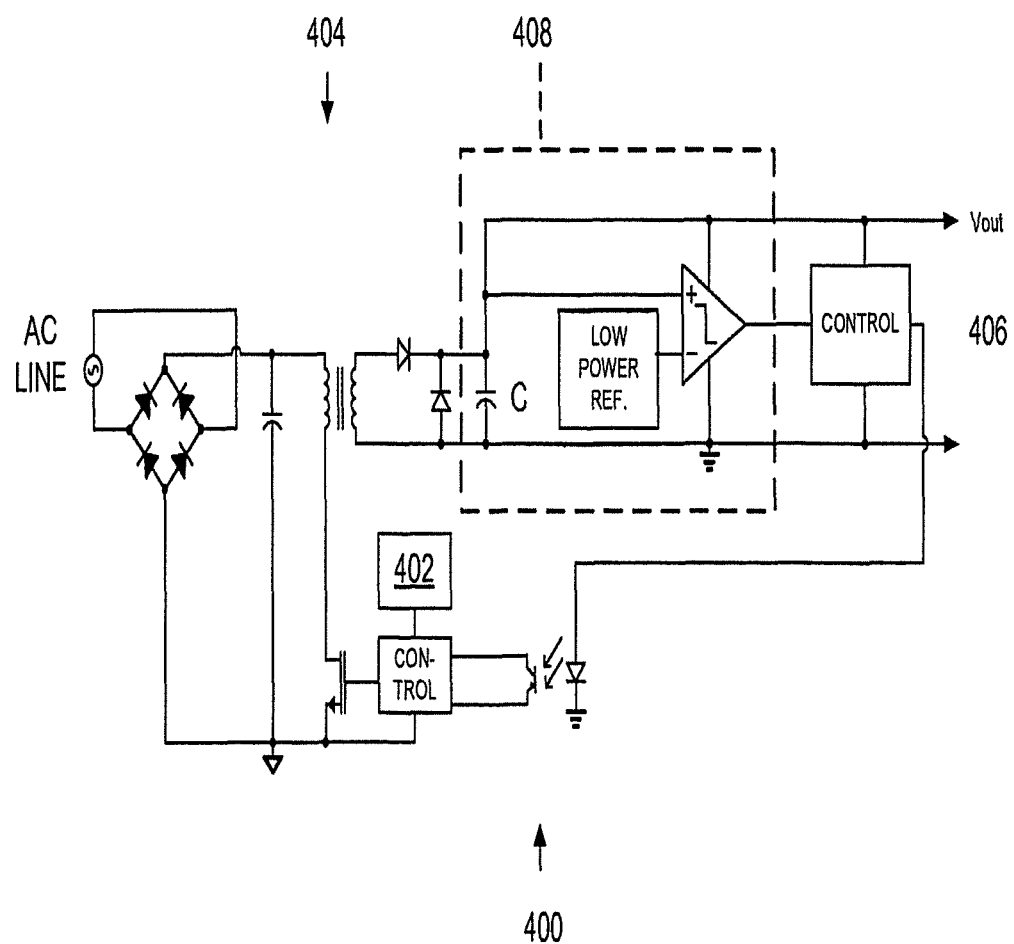
FIG. 4 is a simplified schematic drawing of an example of an alternative preferred embodiment of low power converter circuitry according to the invention.

Additional embodiments of the low power converter of the invention further address the challenge of guaranteeing system startup when the converter system has been idle for an extended period of time. In such a scenario, the power storage element of the enabling circuit, e.g., the output capacitor $C_{OUT}$ of FIG. 1, may be completely discharged. An alternative embodiment of low power converter circuitry is shown in FIG. 4. A timer 402 is coupled to the primary side 404 of the power conversion circuit 404. In this configuration, the system 400 may be configured to automatically turn on periodically and convert power in its active state for a brief period of time. Thus, the output capacitor C, or other suitable energy storage device, may be recharged from time to time, ensuring that the system 400 retains sufficient power to continue monitoring the output 406 for detection of demand for DC output requiring the operation of the power conversion circuit 404 in its active mode. It is contemplated that the timer-induced "on" period can be relatively brief, thus the overall amount of power consumed by the forced turn-on remains small. As an alternative to the use of a timing signal, additional external signals may be used such as wired or wireless communications signals suitable for causing the conversion circuitry 404 to recharge the enabling circuit 408 power source, e.g., storage capacitor C, as shown, or other suitable storage device.

Figure 5:
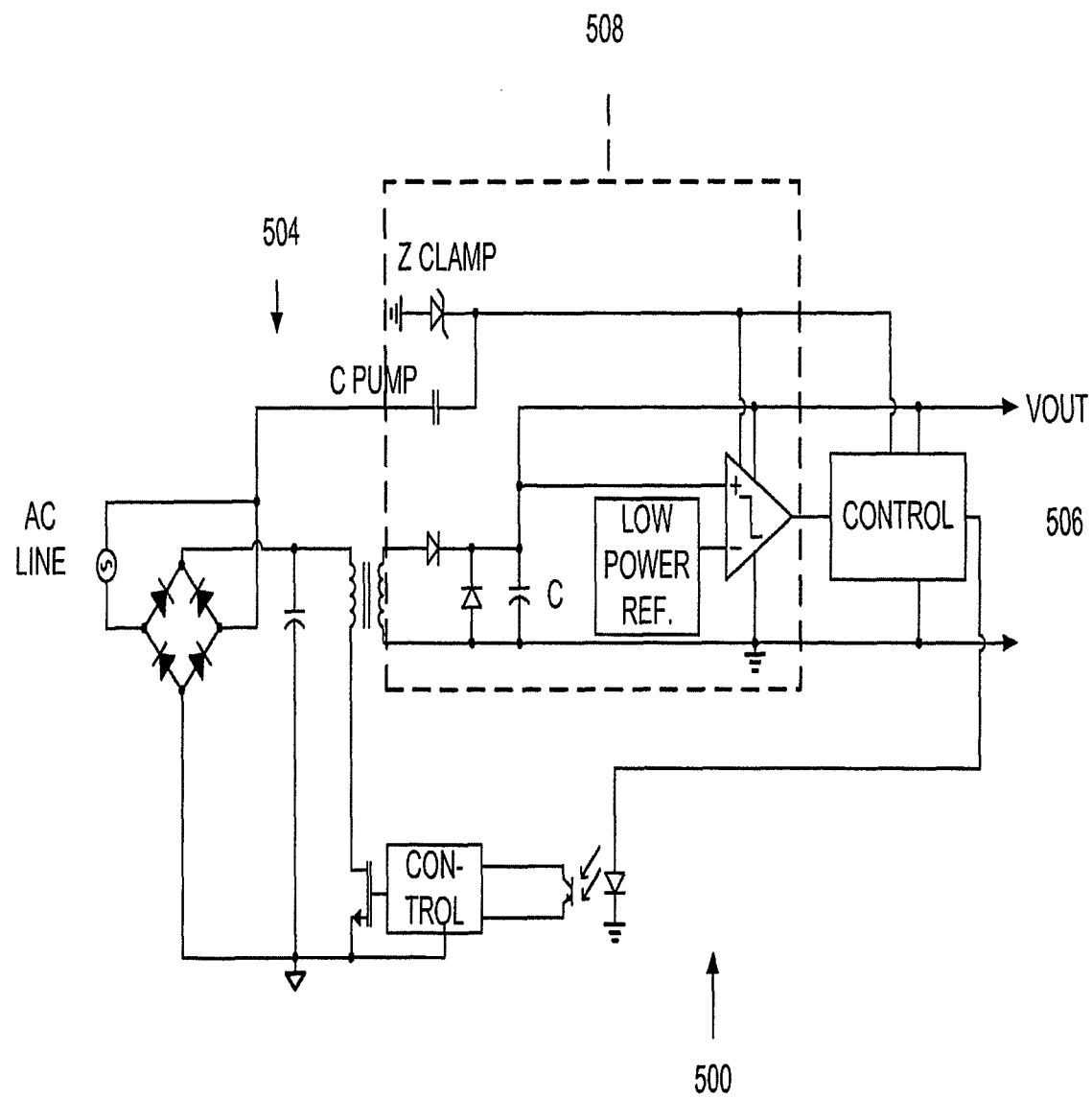
FIG. 5 is a simplified schematic drawing of an example of a preferred embodiment of a preferred embodiment of low power converter circuitry according to the invention.

As illustrated in the schematic diagram of FIG. 5, an alternative embodiment of the low power converter 500 has been developed in which capacitive coupling may be used to provide startup power for the enabling circuit 508. As indicated by arrow 502, the AC signal on the primary side of the conversion circuit 504 operates to pump charge across the capacitor $C_{PUMP}$, providing a start-up voltage for the enabling circuit 508 connected with the secondary side 510 of the conversion circuit 504. A Zener diode $Z_{CLAMP}$ coupled between the enabling circuit 508 and ground is preferably used to limit the voltage sufficiently to protect the circuit 500 from over voltage. The size of the capacitor $C_{PUMP}$ may be selected to limit the power transmission to the secondary side 510 of the conversion circuit 504, and thus also limit the total power dissipated by the enabling circuit 508 in this configuration.

The methods and apparatus of the invention provide one or more advantages including but not limited to improved efficiency in power supply, AC/DC conversion, and energy storage apparatus charging systems. While the invention has been described with reference to certain illustrative embodiments, those described herein are not intended to be construed in a limiting sense. For example, variations or combinations of steps or materials in the embodiments shown and described may be used in particular cases without departure from the invention. Modifications and combinations of the illustrative embodiments as well as other advantages and embodiments of the invention will be apparent to persons skilled in the arts upon reference to the drawings, description, and claims.

We claim:

1. A converter system comprising:
   an input configured for receiving an AC power input signal;
   a conversion circuit for converting the AC input signal to a DC output signal, the conversion circuit operably coupled with the input and to an output for outputting the DC output signal; and
   a timer configured to cause the conversion circuit to switch between an inactive state and an active state in response to a conversion circuit idle period and between an active state and an inactive state in response to a predetermined "on" period.

2. The system of claim 1 wherein the timer is configured for switching the conversion circuit between an active state and an inactive state in response to a charge on a capacitor.

3. The system of claim 1 wherein the timer is configured for switching the conversion circuit between an active state and an inactive state in response to a change in a circuit component.

4. The system of claim 1 wherein the timer is configured for switching the conversion circuit between an active state and an inactive state to maintain a predetermined charge level of a capacitor.

5. The system of claim 1 wherein the timer is configured for switching the conversion circuit between an active state and an inactive state to maintain an energy level of an energy storage device.

6. The system of claim 1 wherein the timer is configured for switching the conversion circuit between an active state and an inactive state independent of a load.

7. A system comprising:
   an input configured for receiving an AC power input signal;
   a conversion circuit for converting the AC input signal to a DC output signal, the conversion circuit operably coupled with the input and to an output for outputting the DC output signal; and
   a timer configured for switching the conversion circuit between an inactive state and an active state and an active state and an inactive state to maintain a charge on a capacitor during periods when a load is receiving no power from the conversion circuit.

8. The system of claim 7 wherein the timer is configured for switching the conversion circuit between an active state and an inactive state for a predetermined minimum period.

9. The system of claim 7 wherein the timer is configured for switching the conversion circuit between an active state and an inactive state for a variable minimum period.

10. The system of claim 7 wherein the timer is configured for switching the conversion circuit between an active state and an inactive state as a function of the load.

11. The system of claim 7 wherein the timer is configured for switching the conversion circuit between an active state and an inactive state as a function of a timing characteristic of the load.

12. The system of claim 7 wherein the timer is configured for switching the conversion circuit between an active state and an inactive state independent of the load.

13. A system comprising:
   an input configured for receiving an AC power input signal;
   a conversion circuit for converting the AC input signal to a DC output signal, the conversion circuit operably coupled with the input and to an output for outputting the DC output signal; and an external signal generator configured for switching the conversion circuit between an inactive state and an active state and an active state and an inactive state to maintain an energy state of an energy storage device during periods when a load is receiving no power from the conversion circuit.

14. The system of claim 13 wherein the external signal generator is configured for switching the conversion circuit between an active state and an inactive state in response to a charge on a capacitor.

15. The system of claim 13 wherein the external signal generator is configured for switching the conversion circuit between an active state and an inactive state in response to a change in a circuit component.

16. The system of claim 13 wherein the external signal generator is configured for switching the conversion circuit between an active state and an inactive state in response to charge level of a capacitor.

17. The system of claim 13 wherein the external signal generator is configured for switching the conversion circuit between an active state and an inactive state to maintain a charge on a capacitor.

18. The system of claim 13 wherein the external signal generator is configured for switching the conversion circuit between an active state and an inactive state to maintain an energy level in an energy storage device.

19. The system of claim 13 wherein the external signal generator is a timer.

* * * * *

UNITED STATES PATENT AND TRADEMARK OFFICE
CERTIFICATE OF CORRECTION

PATENT NO. : 9,793,814 B2
APPLICATION NO. : 14/970396
DATED : October 17, 2017
INVENTOR(S) : Ross E. Teggatz et al.

Page 1 of 1

It is certified that error appears in the above-identified patent and that said Letters Patent is hereby corrected as shown below:

On the Title Page

1. In Column 1, below "Related U.S. Application Data", Line 1 delete Item "(60)" and insert Item -- (63) --, therefor.

Signed and Sealed this
Twenty-seventh Day of February, 2018

Andrei Iancu
*Director of the United States Patent and Trademark Office*